UNITED STATES PATENT OFFICE.

CHARLES NOLL, OF CLEVELAND, OHIO, ASSIGNOR OF ONE-THIRD TO EDWARD C. READER AND ONE-THIRD TO IRWIN A. READER, BOTH OF CLEVELAND, OHIO.

PLASTER COMPOSITION.

1,239,032. Specification of Letters Patent. Patented Sept. 4, 1917.

No Drawing. Application filed March 12, 1917. Serial No. 154,140.

*To all whom it may concern:*

Be it known that I, CHARLES NOLL, a citizen of the United States, residing at Cleveland, in the county of Cuyahoga and State of Ohio, have invented a certain new and useful Improvement in Plaster Compositions, of which the following is a full, clear, and exact description.

This invention relates to compositions such as are employed for the purpose of plastering walls or similar supports or foundations and has for its general objects to provide a composition which, when mixed in the usual manner with water or other liquid, will adhere firmly to the surface to which it may be applied; which may be employed either as an outside or an inside wall coating; which, when so applied, will be substantially impervious to moisture; will not crack or chip; will not abrade; is capable of receiving a coating of paint without absorbing the same; which is adapted for either a smooth (or trowel) finish or a rough (or sand) finish; which is particularly easy to work; which will not deteriorate after such mixing with liquid; and which can be shipped and stored in the dry state without special precautions to protect the same against moisture. Further objects and advantages of the invention will be set forth hereinafter in connection with the detailed description.

In preparing my composition I mix together dry, pulverized slaked lime and yellow clay together with dry screened silica sand and rye flour, in about the following proportions by weight:—

Slaked lime_____ 15 parts
    Yellow clay _____ 20 parts
    Silica sand_____ 60 parts
    Rye flour_____  5 parts This mixture, being dry and free from lumps, may then be shipped in bags or other containers and requires the addition thereto of sufficient water (or other liquid) to produce a plaster of the desired plasticity.

The silica sand (containing about 98% silica) coöperates with the other ingredients to prevent chipping. The rye flour acts not only as a binder with the clay and other ingredients to prevent the plaster from rubbing or flaking off when dry, but coöperates with the clay to impart the desired plasticity to the compound when mixed with the liquid employed as well as to prevent burning of the plaster by the lime constituent. The plaster produced by my compound is smooth, fine-grained and non-absorbent, which renders it particularly capable of receiving directly paste for a wall-paper covering or a coating of paint; moreover, the yellow clay imparts a creamy tone to the plaster which in many instances makes it capable of use as a coating for inside work without the application of any covering, as paint or wall paper. One of its most valuable properties is its ability to adhere directly to concrete without the necessity for specially treating the surface thereof, as has been found necessary in the case of all other plasters with which I am familiar. Should the mortar produced by mixing my composition with liquid dry out, there will be no deterioration, and it may be used by adding sufficient liquid to bring it again to the desired plastic condition. This immunity from injury by moisture enables me to ship my composition in any ordinary non-waterproof container and the consignee to store the same without providing a special moisture-proof building therefor.

In common with other plasters, my composition is adapted to have any desired coloring matter incorporated therewith to produce a tint desired in any particular installation.

While the plaster produced by mixing my composition with water is capable of resisting the weather more efficiently than any stucco with which I am acquainted, I prefer, when using my composition for such outside or stucco work, to mix the same with a moisture-excluding liquid such as linseed oil. This will render it completely weather-resistant, and it will not crack, chip, burn, or rub off. If desired, I may use for such stucco work plaster made up in the same manner as that for inside work, applying thereto a coating of an oil paint, which will render it practically immune from weather conditions, and, because of the non-absorbent character of the plaster, the paint may be applied directly thereto without the necessity for first sizing or otherwise specially treating the same.

Having described my invention, what I claim is:—

1. A composition for making plaster containing slaked lime, clay, silica sand and flour.

2. A composition for making plaster containing slaked lime, yellow clay, silica sand and rye flour mingled in substantially the following proportions by weight:

Dry slaked lime_____ 15 parts
    Dry yellow clay_____ 20 parts
    Dry silica sand_____ 60 parts
    Dry rye flour_____ 5 parts 3. A plaster containing slaked lime, yellow clay, silica sand and rye flour rendered plastic by admixture with liquid.

4. A plaster containing slaked lime, yellow clay, silica sand and rye flour in substantially the proportions specified mingled with a moisture-excluding liquid.

5. A plaster containing slaked lime, yellow clay, silica sand and rye flour mingled with linseed oil.

6. A composition for making plaster containing slaked lime, clay, a binding agent, and silica sand in about the proportions specified.

7. A plaster containing slaked lime, yellow clay, and silica sand in substantially the proportions specified mingled with a moisture-excluding liquid.

8. A plaster containing slaked lime, yellow clay, a binding agent and silica sand in about the proportions specified and rendered plastic by admixture with a liquid.

In testimony whereof, I hereunto affix my signature.

CHARLES NOLL.